United States Patent [19]
Hone et al.

[11] Patent Number: 5,512,740
[45] Date of Patent: Apr. 30, 1996

[54] BAR CODE SCANNER WITH FIELD REPLACEABLE WINDOW

[75] Inventors: L. Michael Hone, Pittsford; Vincent T. LaManna, Webster, both of N.Y.

[73] Assignee: PSC Inc., Webster, N.Y.

[21] Appl. No.: 302,093

[22] Filed: Sep. 7, 1994

Related U.S. Application Data

[63] Continuation of Ser. No. 59,799, May 10, 1993, abandoned.

[51] Int. Cl.$^6$ ........................................ G06K 7/10
[52] U.S. Cl. ............................... 235/472; 235/467
[58] Field of Search ........................ 235/467, 472

[56] References Cited

U.S. PATENT DOCUMENTS

| | | |
|---|---|---|
| 2,163,329 | 6/1939 | Sipior . |
| 2,285,658 | 6/1942 | Hitchcock . |
| 2,961,108 | 11/1960 | Johnson . |
| 3,229,075 | 1/1966 | Palti . |
| 3,587,184 | 6/1971 | Walker, Jr. . |
| 3,768,688 | 10/1973 | Linke . |
| 3,896,589 | 7/1975 | Mitchell . |
| 4,076,373 | 2/1978 | Moretti . |
| 4,454,686 | 6/1984 | Stapenell . |
| 4,466,221 | 8/1984 | Couture . |
| 4,479,656 | 10/1984 | Collins . |
| 4,656,344 | 4/1987 | Mergenthaler et al. . |
| 4,687,127 | 8/1987 | Pardo et al. . |
| 4,700,656 | 10/1987 | Cone et al. . |
| 4,794,240 | 12/1988 | Schorr et al. . |
| 4,826,096 | 5/1989 | Bailey et al. . |
| 5,042,821 | 8/1991 | Bontly . |
| 5,150,528 | 9/1992 | Shire . |
| 5,162,942 | 11/1992 | Anzai et al. . |
| 5,165,782 | 11/1992 | Maglica et al. . |
| 5,177,347 | 1/1993 | Wike, Jr. . |
| 5,181,140 | 1/1993 | Brown et al. . |
| 5,187,354 | 2/1993 | Bengtsson ........................ 235/472 |
| 5,200,597 | 4/1993 | Eastman et al. . |

FOREIGN PATENT DOCUMENTS

| | | |
|---|---|---|
| 67-171126 | 8/1986 | Japan . |
| 61-245130 | 10/1986 | Japan . |
| 3-12582 | 1/1991 | Japan . |
| 7110736 | 2/1972 | Netherlands . |
| 526120 | 9/1972 | Switzerland . |
| 821235 | 10/1959 | United Kingdom . |

*Primary Examiner*—Harold Pitts
*Attorney, Agent, or Firm*—Joseph F. Murphy

[57] ABSTRACT

A hand-held bar code scanner has a field-replaceable optical element (250) such as a window using a rubber boot (110) to hold the window (250) proximate to the scanner housing (101) in front of the housing. The optical element is most typically a window but may also be a filter or lens.

7 Claims, 5 Drawing Sheets

BAR CODE SCANNER WITH FIELD REPLACEABLE WINDOW

This application is a continuation of application Ser. No. 08/059,799, filed May 10, 1993, now abandoned.

FIELD OF THE INVENTION

The present invention relates to systems for scanning and reading bar codes and other optically discernible symbols and, particularly, to a bar code scanner and reader system which is hand-held and has a housing with a window from which the scan beam exits. The present invention relates more particularly to a field-replaceable window and/or optics assembly for a hand-held bar code scanner. Still more particularly an assembly according to the present invention comprises a rubber boot to hold a window and/or optics proximate to the scanner housing in front of the housing. The optical element may be held over the optical window opening by means of a end cap called a "boot". The optical element is most typically a window but may also be a filter or lens.

RELATED APPLICATIONS

This application is related to a design application entitled "Hand-held Optical Scanner" filed on May 10, 1993, Ser. No. 29/008,077. It is also related to a design application entitled "Hand-Held Optical Scanner" filed on May 4, 1993 Ser. No. 29/007,917. Both of these design applications are assigned to PSC, Inc., to which the present application is commonly assigned.

BACKGROUND AND SUMMARY OF THE FEATURES OF THE INVENTION

Laser-scanner based bar code reader systems have been in use for some time. These scanners typically comprise a housing having a laser and associated optics therein. Such a laser and associated optics are disclosed, for example, in U.S. Pat. No. 5,200,597, issued to Jay Eastman, et al., on Apr. 6, 1993 and hereby incorporated by reference, wherein the laser is integrated together with electronics on a "scan engine" comprising a printed circuit board. The housing is typically a closed structure which supports, among other components, the laser which produces light to scan the target, and the photodetector which receives light returned from the scanned target. Again typically, the housing has at least one optical window. Light from the laser is optically directed to exit this window, and light returned from the scanned bar code enters this window and is directed toward the photodetector. Thus, the performance of the scanner is in many respects dependent on this window. The window must be quite light transmissive, and hard enough to resist damage. Unfortunately, during ordinary scanner operation, the window may become damaged and require replacement. In known scanner systems of the prior art, the window could only be replaced by disassembling the unit, and reconstructing the housing, and reassembling the scanner.

No presently known bar code scanner features a field replaceable window. Yet other devices have field replaceable windows. None of the existing designs of the prior art suggest even the possibility, let alone how, a field replaceable window could be incorporated in a bar code scanner.

Upgrading a window, too, would be desirable. It may, for example, be desirable to upgrade a bar code window to a "Brewster Scanner Window" of the type disclosed in a patent application Ser. No. 08/059,045 filed on May 7, 1993 entitled Brewster Window Bar Code Scanner in the name of Edward Coleman, et al and assigned to the present assignee.

It may also be desirable to add other optical elements or functions to the scanner. For example, a filter, or special anti-scratch coating might be desirable in one environment, and coated optics in another environment.

A lens cap having a window therein is shown in U.S. Pat. No. 5,162,942, issued to Anzig, et. al. The lens cap window features an interior transparent pane, and an exterior semi-transparent (e.g. merely translucent) pane, with a gap known as a title inserting portion between the two panes. (Col. 5, lines 50–65) Into this title insertion portion is placed a "title recording paper" upon which desired screen titles are written for easy photographing in macro or close-up fashion.

A seal assembly for covering an indicator light opening in a control panel is shown in U.S. Pat. No. 3,587,184, issued to Walker. In Walker, an elastomeric seal covers the entirety of the opening, and a window is inserted into an integral lip on the outside of that window. The elastomeric seal, unlike that of the present invention, covers the entire opening.

Bengtsson, in U.S. Pat. No. 5,187,354, discloses an hand scanner for reading bar codes and deactivating surveillance tags, which uses a "rubber cuff or sleeve" to hold permanent magnets about the periphery of an opening in the housing. (Col. 2, lines 29–35). Bengtsson does not teach anything about securing a window about the opening of a scanner.

U.S. Pat. No. 5,177,347, issued to Wike, states "a scanning unit 26 is mounted within the main body portion 24 by means of a support ring 28 which, in addition to supporting the scanning unit 26, also supports a cover member 30 having an opening 32 in which is positioned the face portion 34 of the scanning unit 26. The cover member 30 may be constructed of a transparent material such as acrylic and is shock mounted with respect to the face portion 34 by means of a ring of elastic foam material 36." (Col. 2, line 65 to Col. 3, line 6).

Unlike the present invention the cover in Wike does not support a window. Instead that the cover is supported by a ring. This ring on the main body supports, on one side, the cover with an opening therein, and the same ring supports, on the other side, the scan unit having a [window-like] face 34 thereon. Thus, the cover is supported by the same structure as the face; unlike in the present invention, the cover itself does not support the face. Thus, changing the cover of Wike does not afford any easy way of changing any optical element of Wike. Thus, Wike does not teach the present invention.

U.S. Pat. No. 5,165,782, to Maglica et al. discloses a "Shock absorbing lens holder and anti-roll device" for a flashlight; it teaches a way of holding a filter in front of the flashlight lens. This patent does not teach the apparatus of the present invention, which is composed entirely of shock absorbing material, and which requires no further frame, anti-roll or otherwise, to hold it in place. Furthermore, Maglica's apparatus requires that it be mounted on a flashlight already having a sealed lens; the present invention provides what may be a lens, or window, and mounts directly on the scanner.

BRIEF DESCRIPTION OF THE DRAWINGS

FIG. 5 shows the rubber lip.

DETAILED DESCRIPTION

Figure 1:
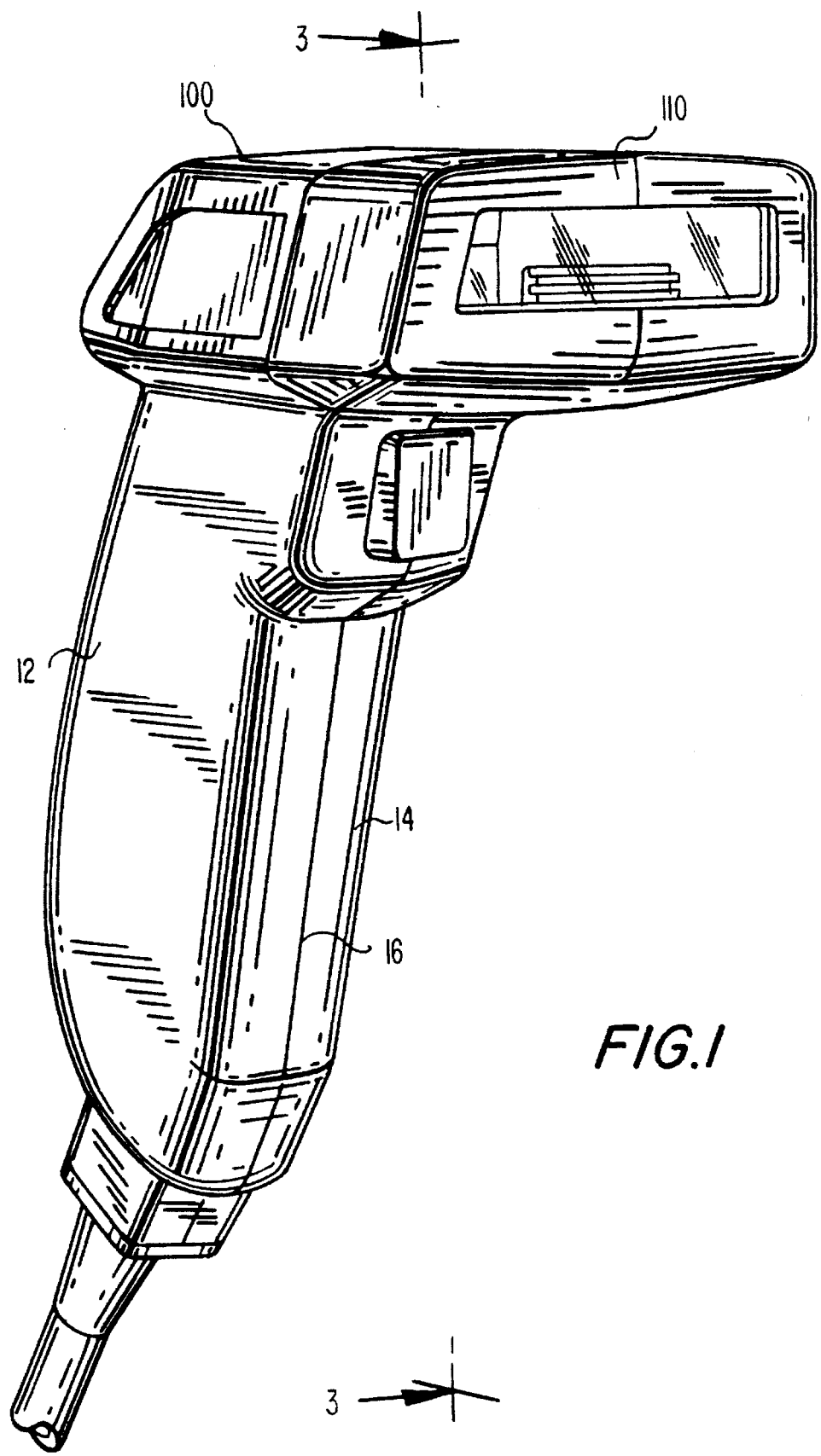
FIG. 1 is a front perspective elevational view of a bar code scanner and reader system in accordance with a presently preferred embodiment of the invention.

Referring first to FIGS. 1–4, there is shown a portable bar code laser scanner 100 and a reader. A housing 101 contains the electronics and optics of the unit. It is a bi-part shell having left 12 and right 14 portions which are assembled together along a parting plane 16 where the portions interconnect. The housing is similar to that disclosed in U.S. Pat. No. 5,200,597, referenced above, but has in addition on its head a scanner window frame, called a boot 110, of elastomeric material (rubber like) which is adapted to receive the head of bar code laser scanner. The boot 110 captures a window 250 or other optical element, against the face of the forward end of the housing.

FIG. 1, Shows the housing as a bi-part case having two halves 12 and 14 assembled to define a parting line 16.

Figure 2:
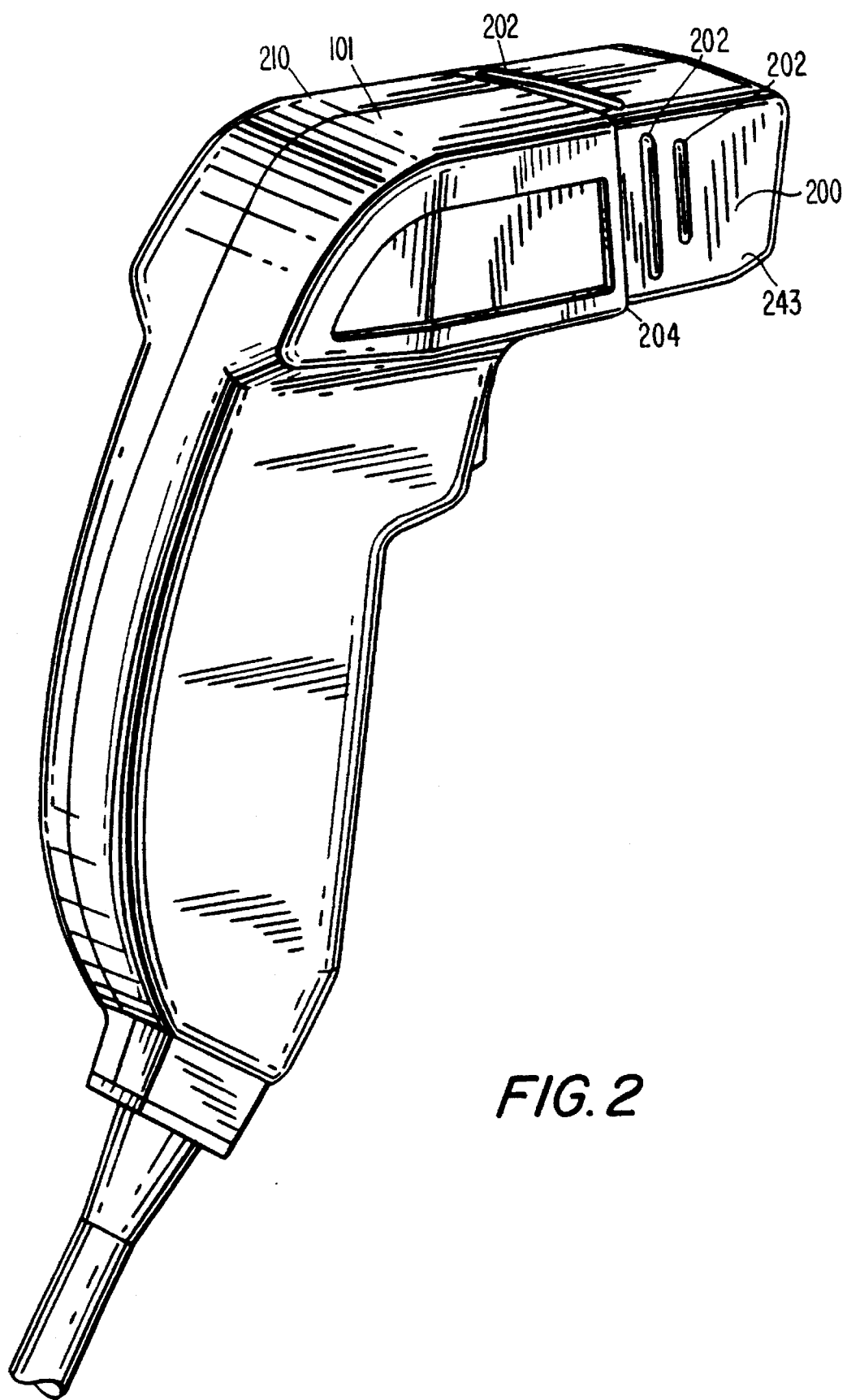
FIG. 2 is a right side perspective view of the bar code scanner of FIG. 1.
Figure 3:
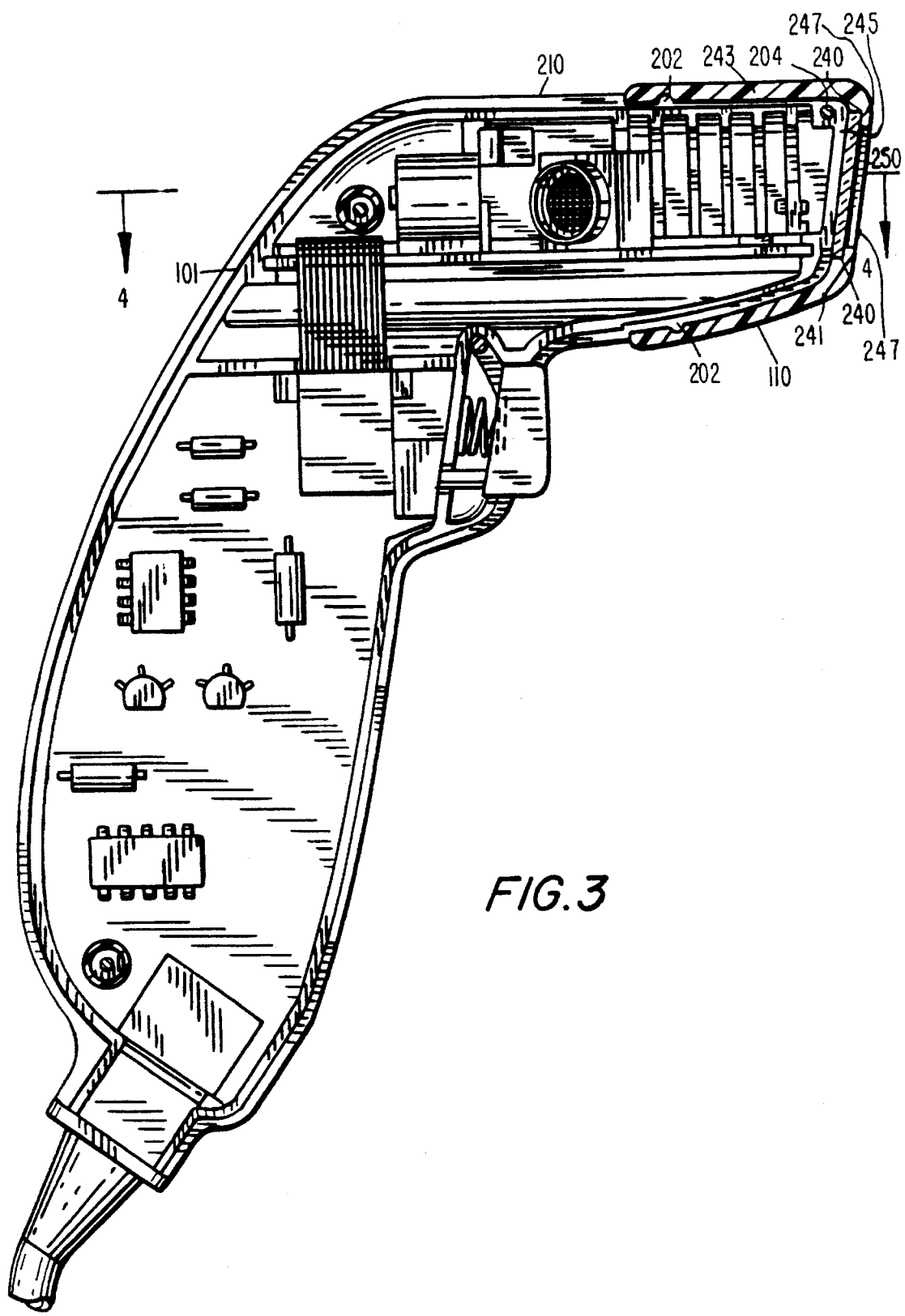
FIG. 3 is a sectional view taken along line 3—3 in FIG. 1.
Figure 5:
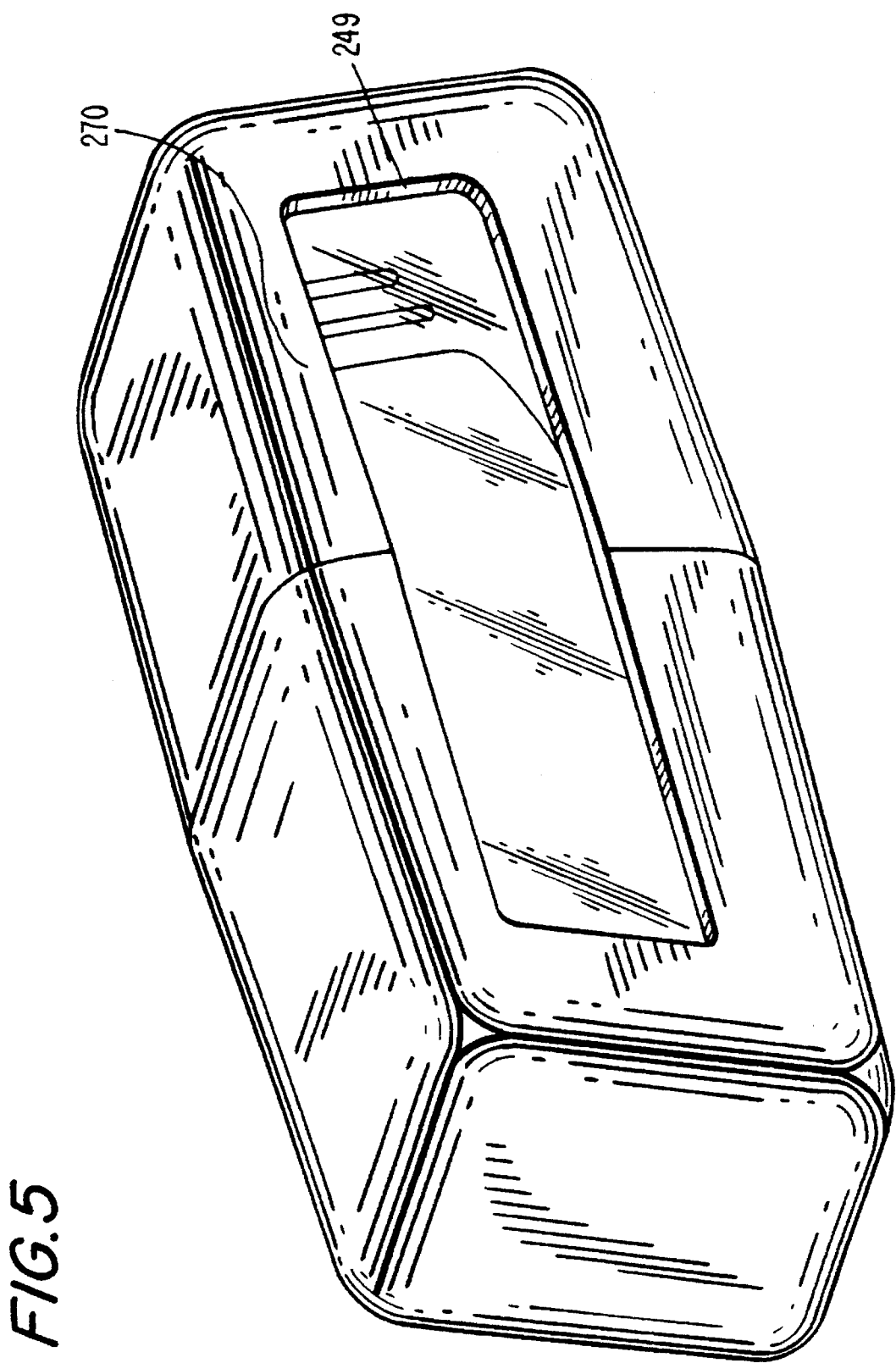
FIG. 5 is a perspective view of the boot used with the bar code scanner.

FIG. 2 shows the scanner with the boot 110 removed, and FIG. 3 is a sectional view of the scanner 100 taken along line 3—3 of FIG. 1. 202 ribs or tabs secure the boot. The exterior dimensions of the head of the scanner which receives the boot (in the nose part 247 of the head) are slightly less than those of the rest of the head, which do not receive the boot. The boot can then be essentially flush with the exterior of the housing in the back of the nose 243. In fact, the dimensions at the face 240 on the front end 242 of the nose 243 of the head are nearly equal those at the back 210 of the head. The face 240 of the nose 243 defines a frame containing a step or ledge 245. The front end of the boot has a shoulder 249 (FIG. 5) along its top and bottom and left and right sides.

Figure 4:
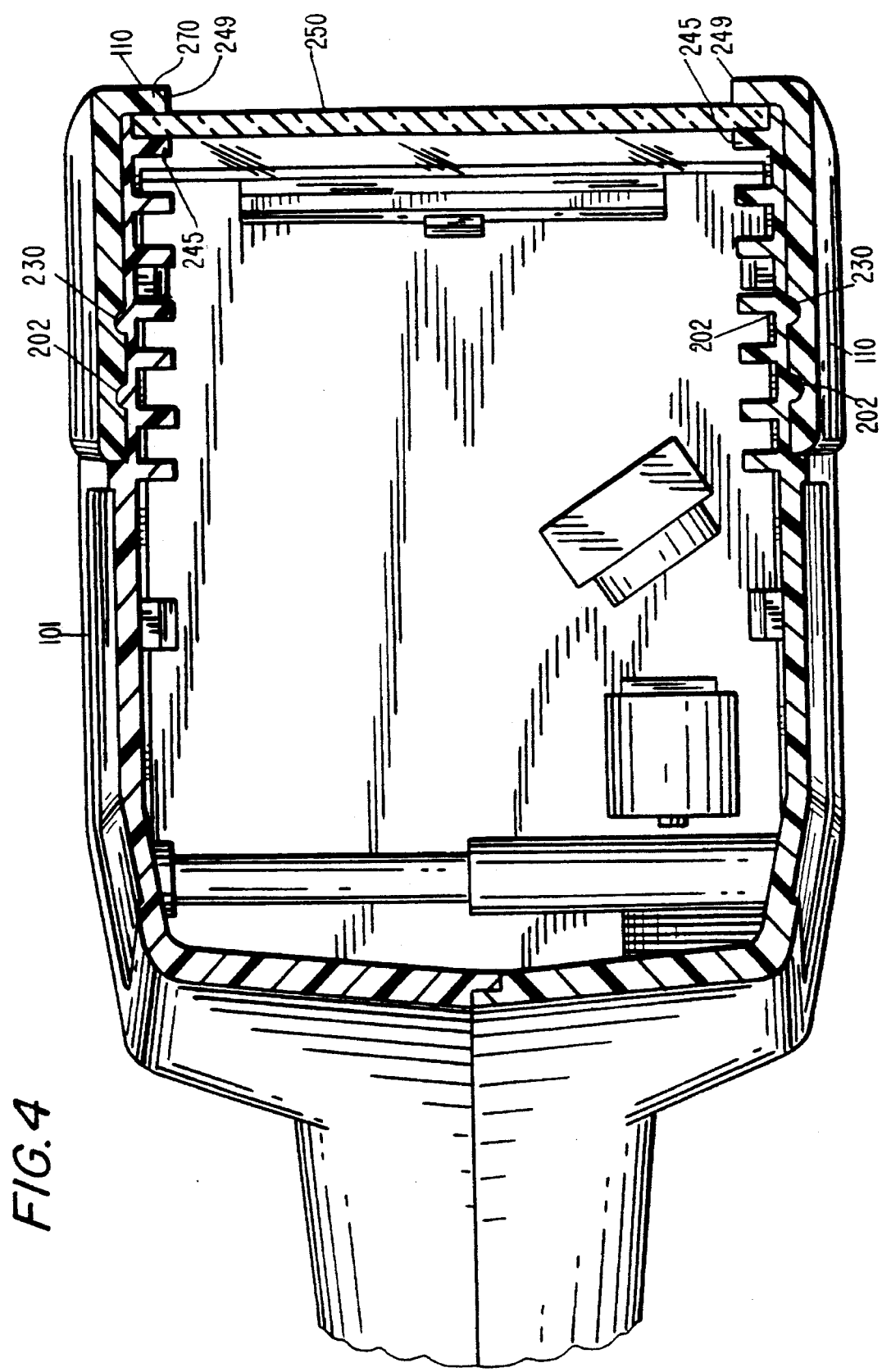
FIG. 4 is a sectional view taken along line 4—4 in FIG. 3.

FIG. 4 is a sectional view of the scanner 100 with the boot mounted thereon and taken along line 4—4 of FIG. 3. Boot 110 has detents 230 which are adapted to receive tabs 202. The step 245 provides a shoulder at the face 240. This shoulder defines a rectangular opening in which the optical element (e.g. the window 250, though it could be another optical element) is received and held in position. The resilience of the boot assures a snug fit of the element. Window 250 has four sides; its top and bottom sides, as well as its left and right sides, fit in close relation inside and upon shoulder (also called a step or ledge) 245 at the scanners face 240. In other words window 250 is held in place by the rubber boot 110, the front end opening of which is of smaller dimensions than window 250 so that the top, bottom and right and left sides define a rubber lip 270, 249 (shown in perspective view in FIG. 5), will retain window 250 against shoulder 240.

FIG. 4 also shows the interior structure of the head, and in particular shows how ribs 202 which are integral with housing 101 in its nose 243 catch the indentations or detents.

We claim:

1. A bar code scanner comprising:

a housing;

a bar code scanning device having a laser for generating a laser beam and a photodetector secured within said housing;

said laser beam optically directed to exit said housing through an optical element to scan a target;

said photodetector positioned to receive said laser beam reflected from said target through said optical element;

said housing having a nose section with an end face, said end face having an opening defined at least in part by a shoulder;

said optical element seated adjacent said shoulder; and a boot of elastomeric material removably positioned around said nose section and securing said optical element against said shoulder and thus to said housing.

2. The assembly of claim 1 wherein said nose section has a maximum dimension at the front of the nose, which tapers down to a smaller circumferential dimension inward from the nose, so as to provide an essentially flush fit of a boot which is installed thereon.

3. The assembly as claimed in claim 2 further comprising lips on said boot along sides and a top and bottom thereof, said lips defining an opening and overlapping the element to be captured.

4. The assembly as claimed in claim 3 wherein said element is transparent.

5. The assembly as claimed in claim 3 wherein said element is non-transparent.

6. The assembly as claimed in claim 3 wherein said element is a Brewster Window.

7. The assembly as claimed in claim 3 wherein said element is a filter.

* * * * *